United States Patent
Critz et al.

(10) Patent No.: US 11,962,895 B2
(45) Date of Patent: Apr. 16, 2024

(54) IMAGE-BASED DETECTION OF IMAGE SENSOR SHUTTER STATE

(71) Applicant: DELL PRODUCTS L.P., Round Rock, TX (US)

(72) Inventors: Christian L. Critz, Liberty Hill, TX (US); Bryan James Thornley, Burnet, TX (US); Karun Palicherla Reddy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 17/867,509

(22) Filed: Jul. 18, 2022

(65) Prior Publication Data
US 2024/0022811 A1    Jan. 18, 2024

(51) Int. Cl.
*H04N 23/66*    (2023.01)
*G06T 7/70*    (2017.01)
*G06V 10/75*    (2022.01)

(52) U.S. Cl.
CPC ............ *H04N 23/66* (2023.01); *G06T 7/70* (2017.01); *G06V 10/751* (2022.01)

(58) Field of Classification Search
None
See application file for complete search history.

(56) References Cited

U.S. PATENT DOCUMENTS

| | | | |
|---|---|---|---|
| 9,179,105 B1 * | 11/2015 | Zeira ................... | H04N 7/183 |
| 11,089,196 B1 * | 8/2021 | Hampton .............. | H04N 23/51 |
| 2021/0127045 A1 * | 4/2021 | Clark .................. | G03B 11/043 |
| 2022/0353403 A1 * | 11/2022 | Matsumoto ........... | G03B 7/097 |

OTHER PUBLICATIONS

Maruthaiyan, Bremi, Camera ISP and significance of using an external ISP in imaging solutions, https://www.e-consystems.com/blog/camera/technology/the-significance-of-using-an-external-isp-in-imaging-solutions/, Aug. 25, 2021, 1 page.

* cited by examiner

*Primary Examiner* — Cynthia Segura
(74) *Attorney, Agent, or Firm* — Larson Newman, LLP

(57) ABSTRACT

An intelligent imaging device determines an occlusion of a shutter mechanism. The shutter mechanism opens to expose light to an image sensor, and the shutter mechanism closes to block the light from entering the image sensor. However, as the shutter mechanism transitions between full open and full close, the shutter mechanism is partially open and exposing the light to the image sensor. The image sensor continues generating images during these transitions, thus possibly revealing personal/sensitive data. The intelligent imaging device determines the shutter mechanism is partially open by conducting a real time, frame-by-frame content analysis. The intelligent imaging device may then disable an interface to the image sensor to avoid sharing personal/sensitive data. Even if the shutter mechanism is manually operated, the intelligent imaging device implements a visual/audible warning to warn a user that the shutter mechanism is not completely open or closed.

19 Claims, 14 Drawing Sheets

IMAGE-BASED DETECTION OF IMAGE SENSOR SHUTTER STATE

FIELD OF THE DISCLOSURE

This disclosure generally relates to information handling systems, and more particularly relates to vision sensors and shutter mechanisms.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An intelligent imaging device determines a position and/or an occlusion of a shutter mechanism. The shutter mechanism opens to expose light to an image sensor, and the shutter mechanism closes to block the light from entering the image sensor. However, as the shutter mechanism transitions between full open and full close, the shutter mechanism is partially open and exposing the image sensor to the light. The image sensor continues generating images during shutter transitions between full open and full close, thus possibly revealing embarrassing or undesirable images of a user, her background environment, and/or personal/sensitive data. The intelligent imaging device determines when the shutter mechanism is partially open by inspecting the images generated from the image sensor. The intelligent imaging device conducts a real time, frame-by-frame image content analysis using a library of reference images depicting the shutter mechanism moving or transitioning between full open and full close. The image content analysis may be enhanced by using artificial intelligence according to any AI model. When the shutter mechanism is determined to be partially open, the intelligent imaging device may then disable an interface to the image sensor. By disabling the interface to the image sensor, the intelligent imaging device cuts off outputs from the image sensor during transitions between full open and full close.

The intelligent imaging device may also warn the user. When the intelligent imaging device determines the shutter mechanism is partially open, the intelligent imaging device may initiate a visual and audible notification. The notification alerts the user that the shutter mechanism is partially open, perhaps compromising the user's privacy or ruining her facial image. The notification is especially helpful when the shutter mechanism is manually opened and closed. The user may thus manually slide or fully close the shutter mechanism to ensure her privacy. Alternatively, the user may fully open the shutter mechanism to clearly capture her image and background environment.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
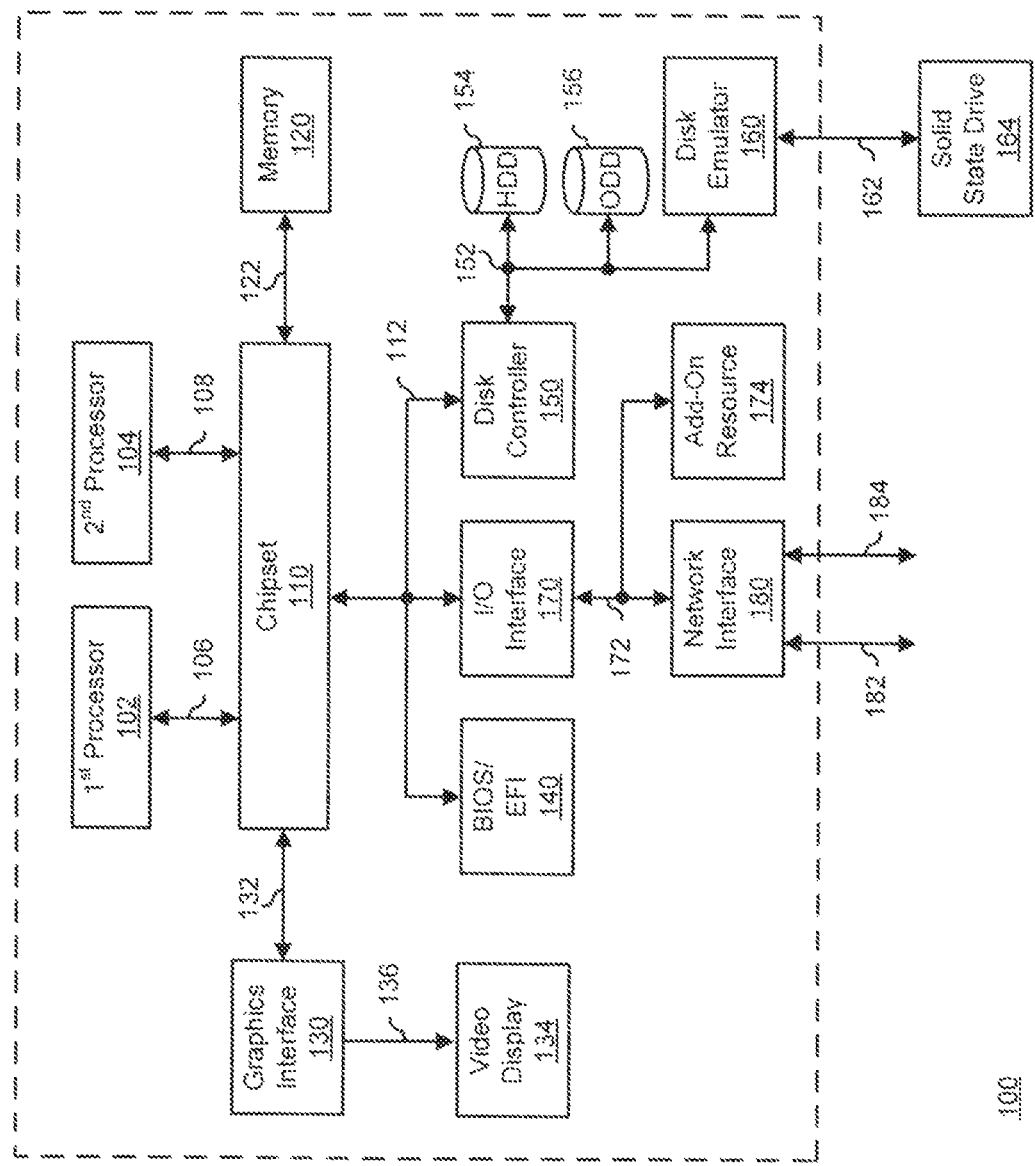
FIG. 1 illustrates an information handling system incorporating an intelligent imaging device, according to exemplary embodiments.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, and a network interface device 180. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface device 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a sound card, data storage system, an additional graphics interface, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel is of a different type than peripheral channel 172 and network interface device 180 translates information from a format suitable to the peripheral channel to a format suitable to external devices. In a particular embodiment, network interface device 180 includes a host bus adapter (HBA), a host channel adapter, a network interface card (NIC), or other hardware circuit that can connect the information handling system to a network. An example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

The information handling system 100 may include a baseboard management controller (BMC). The BMC is connected to multiple elements of information handling system 100 via one or more management interface to provide out of band monitoring, maintenance, and control of the elements of the information handling system. As such, BMC represents a processing device different from processors 102 and 104, which provides various management functions for information handling system 100. In an embodiment, BMC may be responsible for granting access to a remote management system that may establish control of the elements to implement power management, cooling management, storage management, and the like. The BMC may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface that may include an inter-integrated circuit ($I^2C$) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC includes a network interface that can be connected to a remote management system to receive firmware updates, as needed or desired. Here BMC receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC utilizes various protocols and application programming interfaces (APIs) to direct and control the processes for monitoring and maintaining the system firmware. An example of a protocol or API for monitoring and maintaining the system firmware includes a graphical user interface (GUI) associated with BMC, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC is included on a main circuit board (such as a baseboard, a motherboard, or any combination thereof) of information handling system 100, or is integrated into another element of the information handling system such as chipset 110, or another suitable element, as needed or desired. As such, BMC can be part of an integrated circuit or a chip set within information handling system 100. BMC may operate on a separate power plane from other resources in information handling system 100. Thus BMC can communicate with the remote management system via network interface or the BMC can communicate with the external mobile device using its own transceiver circuitry while the resources or elements of information handling system 100 are powered off or at least in low power mode. Here, information can be sent from the remote management system or external mobile device to BMC and the information can be stored in a RAM or NV-RAM associated with the BMC. Information stored in the RAM may be lost after power-down of the power plane for BMC, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, there may be hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

Figure 2:
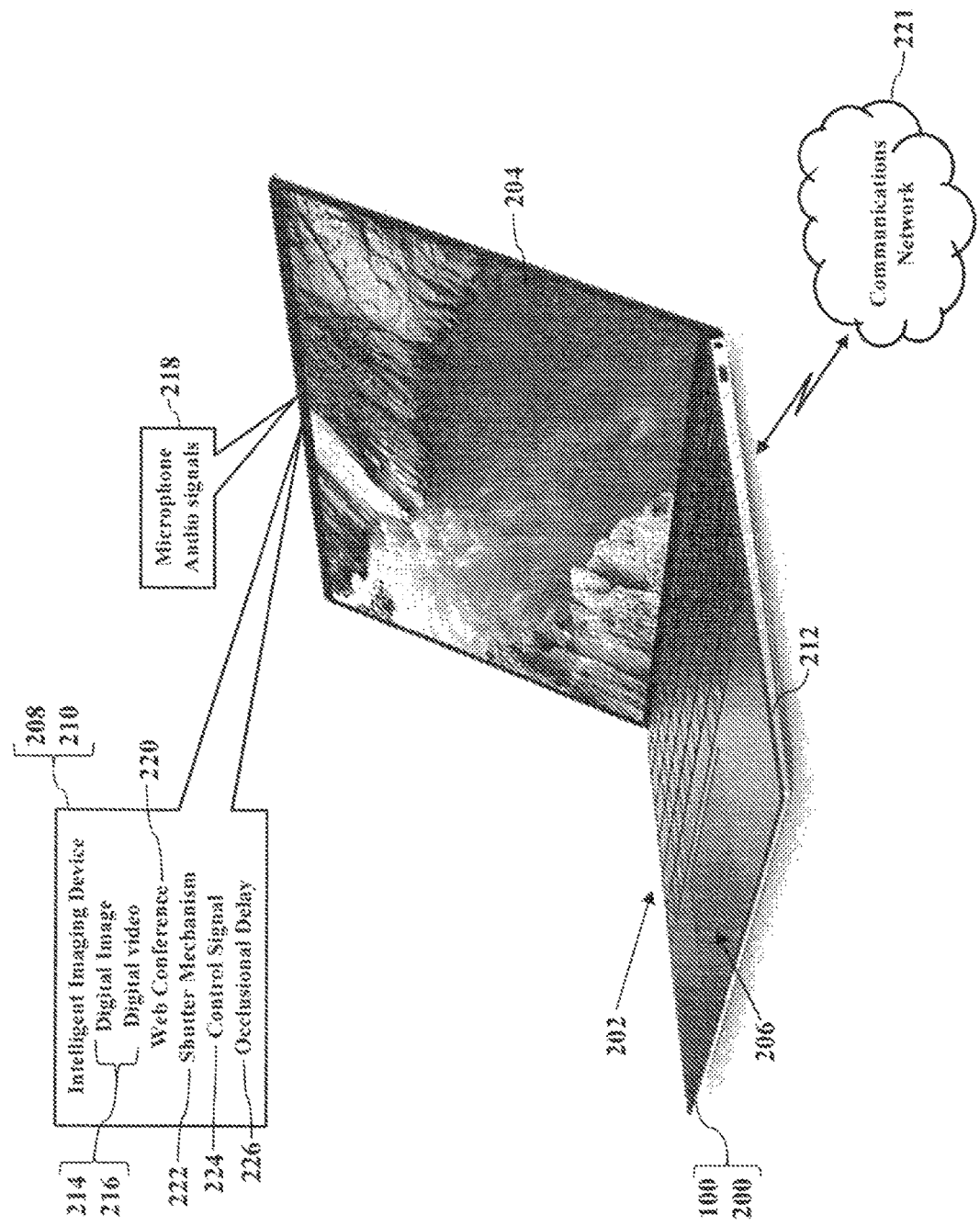
FIGS. 2-3 further illustrate the information handling system, according to exemplary embodiments.
Figure 3:
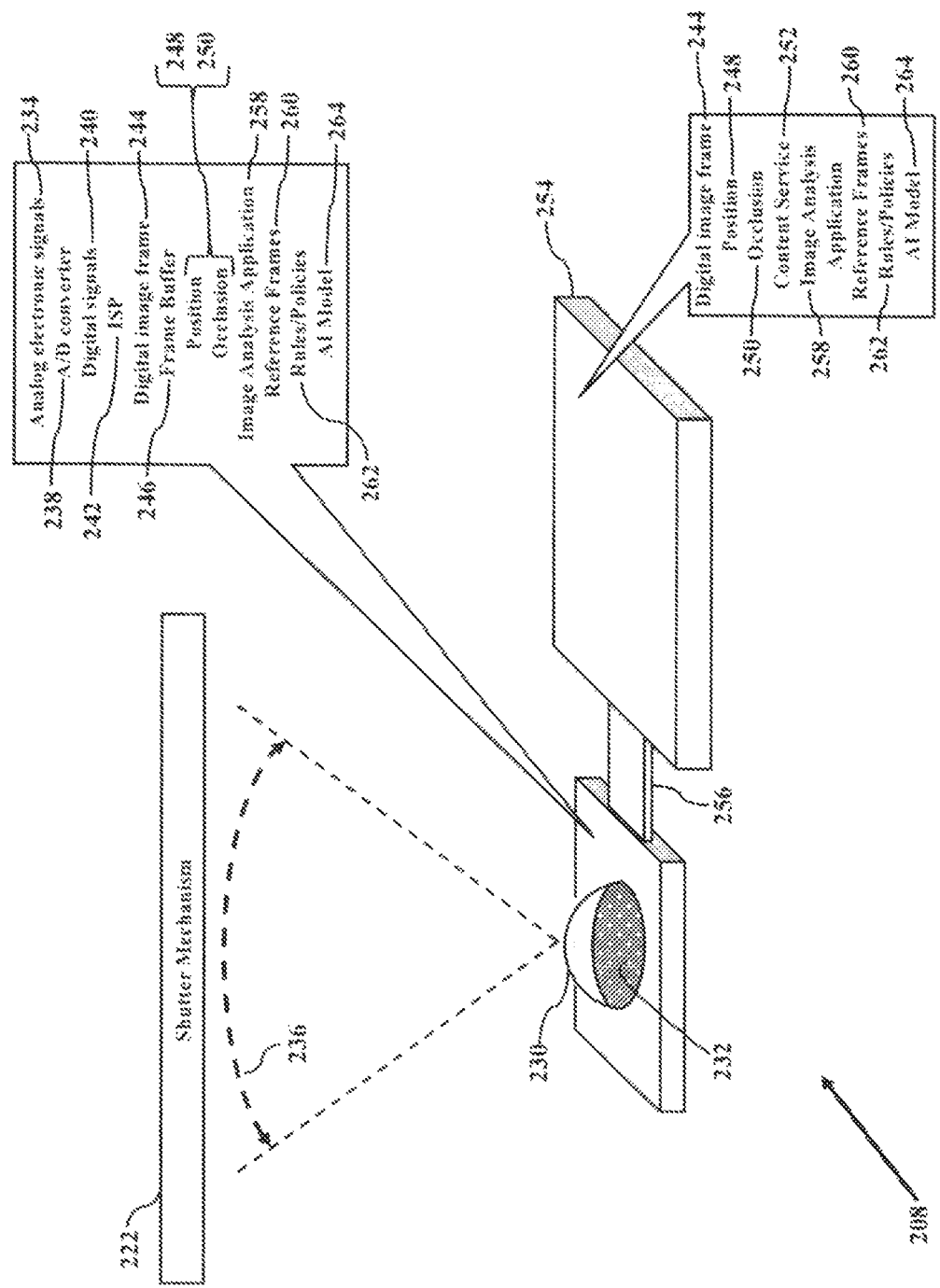

FIGS. 2-3 further illustrate the information handling system 100, according to exemplary embodiments. The information handling system 100 is illustrated as a mobile or portable laptop computer 200, which most readers are thought familiar. The information handling system 100, however, may also be embodied as a smart cellular telephone, a desktop computer, a tablet computer, or any other processor-controlled device. As the reader likely understands, the laptop computer 200 may be used for video conferencing and for digital photography. As a user types on a keyboard 202 and/or touches or navigates a touch screen display 204 and a touch panel 206, an intelligent imaging device 208 (or more commonly known as a web camera 210) captures/generates digital images and videos ("selfies") of the user. FIG. 2 illustrates the intelligent imaging device 208 incorporated as an upper component of a bezel surrounding the touch screen display 204, but the intelligent imaging device 208 may be alternatively incorporated as a component into an outer enclosure or chassis 212. The intelligent imaging device 208 captures digital images 214 and video 216 of the user, while a microphone 218 also captures audio signals representing the user's speech. The user may thus conduct a web conference 220, using the laptop computer 200, via a communications network 221 (such as the Internet).

Video conferencing, though, has its share of privacy and security landmines. The web camera 210 may capture content regarded as inappropriate, embarrassing, or unprofessional. The digital images 214 and video 216 may thus contain depictions of unkempt hair, partial or inappropriate clothing, nudity, or objects or activities that may be inappropriate or embarrassing. Indeed, social media is filled with embarrassing videos of those who forget to disable, or turn off, the web camera 210.

The laptop computer 200 may thus include a shutter mechanism 222. The shutter mechanism 222 is a privacy and security feature that physically prevents light or photons from entering the web camera 210. When the user of the laptop computer 200 desires privacy, the shutter mechanism 222 moves, deploys, or changes to block the web camera 210. The shutter mechanism 222, for example, may be an electromechanical louver, door, or panel (not shown for simplicity) that opens and closes in response to electrical power and to a control signal 224 (perhaps from the chipset 110 and/or the I/O interface 170, illustrated in FIG. 1). The shutter mechanism 222 may be human/user manually operated by sliding a door or other optical barrier over the web camera 210. The shutter mechanism 222 may additionally or alternatively have an electrochromic design or feature that darkens to prevent entry of light/photons into the web camera 210. Conversely, the electrochromic design or feature lightens to permit entry of light/photons. Regardless of the shutter mechanism's operation, when the shutter mechanism 222 allows light/photons to enter the web camera 210, the web camera 210 generates clear and colorful digital images 214 and video 216 for web conferencing. When, however, the shutter mechanism 222 stops or prevents ambient light/photons from entering the web camera 210, the web camera 210 generates no signals or outputs, or black colors, representing digital images 214 and video 216. The control signal 224 thus commands or instructs the shutter mechanism 222 to open or to close. The shutter mechanism 222 is commanded to operate when the web camera's operation is desired (such as during video conferencing), but the shutter mechanism 222 may also be commanded to close or occlude when the web camera's operation is not desired (for privacy and security).

Partial operational states pose problems. The shutter mechanism 222 has partial positions or states in between fully opened and fully closed. That is, even though the shutter mechanism 222 is commanded or instructed to close, time and/or movement is/are required from the fully open condition or position to the fully closed condition or position. As the shutter mechanism 222 electrochromically or electromechanically transitions from fully open to fully closed/occluded, some light/photons still enter the web camera 210. Digital images 214 and video 216 are still generated, albeit perhaps darker and darker. Indeed, testing and use have revealed that the web camera 210 may be actuated multiple times, and under various conditions (such as an enabled "always-on low power vision" configuration and/or a WINDOWS® HELLO® biometric notification). This occlusional delay 226 has led to corner cases whereas the state of the shutter mechanism 222 does not reflect the state of the control signal 224 that disables and enables the shutter mechanism 222. The shutter mechanism 222 could be partially open or closed, thus allowing the web camera 210 to generate video of the user. The user's face and background, in other words, may still be captured during the web conference 220.

Privacy and security are a concern. Because the shutter mechanism 222 is partially open while transitioning from full open to full close, light still enters the web camera 210 and images are still generated. Indeed, perhaps a second or more is required for the shutter mechanism 222 to transition between full open and full close (whether electromechanically or manually). The web camera 210 may capture many image frames during the occlusional delay 226 between full open and full close. If, for example, the user wants the shutter mechanism 222 fully closed for privacy, her privacy is violated during the occlusional delay 226. If the user wants the shutter mechanism 222 fully open for best imaging, her image 214 and video 216 are occluded and of poor quality. The partially open shutter mechanism 222 thus fails the user's expectations and experience.

FIG. 3 illustrates software-based corrective actions. Exemplary embodiments may compensate for the partially open shutter mechanism 222. When the shutter mechanism 222 is partially open, exemplary embodiments stop the web camera 210 from generating the digital images 214 and video 216. The user's face, for example, is not inadvertently transmitted when privacy is desired during the occlusional delay 226. The user's poor/occluded image is not transmitted when image quality is desired during the occlusional delay 226. Exemplary embodiments may thus correct for the actual state of the shutter mechanism 222, despite the control signal 224.

As FIG. 3 illustrates, exemplary embodiments detect a state of the shutter mechanism 222. Because the intelligent imaging device 208 is very small (generally less than five millimeters (5 mm) in diagonal width), FIG. 3 is enlarged for clarity. The intelligent imaging device 208 may be packaged with one or more optical lenses 230 that focus electromagnetic waves (such as visible and/or infrared frequencies or "light") into or onto an image sensor 232. The shutter mechanism 222 is generally arranged to overlay the intelligent imaging device 208. When the shutter mechanism 222 is fully open or transparent, the lens 230 focuses the light onto the image sensor 232. The image sensor 232 may generate analog electronic signals 234, representing the user or other visual subject, captured within a field 236 of view of the image sensor 232 and the lens 230. The intelligent imaging device 208 may have an internal, integrated analog-to-digital converter 238 that converts the electronic signals 234 into digital signals 240. An internal, integrated image sensor processor (or "ISP") 242 receives the digital signals 240 and processes the digital signals 240 as a single, digital image frame 244. The ISP 242 may store the digital image frame 244 in memory (such as a frame buffer 246). The ISP 242 may then perform a content analysis of the digital image frame 244 to determine a position 248 and/or occlusion 250 of the shutter mechanism 222.

The intelligent imaging device 208 may also interface with a content service 252. The content service 252 may cooperate with the intelligent imaging device 208 to determine the position 248 and/or occlusion 250 of the shutter mechanism 222. While the content service 252 may be any network resource, FIG. 3 illustrates a system-on-chip (or "SOC") 254 that interfaces with the intelligent imaging device 208. The intelligent imaging device 208 may send the digital image frame 244 (perhaps via a flexible ribbon printed circuit 256) to the system-on-chip 254. The system-on-chip 254 performs the content analysis of the digital image frame 244 to determine the position 248 and/or occlusion 250 of the shutter mechanism 222.

The shutter mechanism 222, however, may block the image sensor 232. The shutter mechanism 222 has a size and arrangement to selectively prevent the light from entering the image sensor 232. When no light strikes the image sensor 232, its photoelectronic components do not generate the analog electronic signals 234. The image sensor 232 may thus produce no output. The ISP 242 may not generate the digital image frame 244, or, the ISP 242 may generate a mostly or purely black/void frame 244. The black/void frame 244 may thus have no digital content to analyze.

Exemplary embodiments may thus use pixelated content/image analysis to infer the position 248 of, and/or occlusion 250 by, the shutter mechanism 222. When the shutter mechanism 222 is commanded to close, or manually moved to close, the shutter mechanism 222 has partially open states/positions when progressing from full open to full close. Similarly, even though the shutter mechanism 222 may be commanded or manually moved to full open, the shutter mechanism 222 is partially open when progressing from full close to full open. Exemplary embodiments may thus infer or estimate the actual position 248 or occlusion 250 of the shutter mechanism 222, based on pixel data represented by the digital image frame 244. The image sensor 232 has millions or even billons of extremely small components (sometimes called pixels). The image sensor 232 may be a front or back illuminated solid-state device, and currently today CCD/CMOS pixels are arranged as a grid. The actual construction of the CCD/CMOS/pixels, though, is not important for this disclosure. In general, when electrical power (voltage and/or current) is provided to a pixel, the pixel receives an incident electromagnetic wave or photon and photoelectrically converts the incident wave/photon to the analog signal 234. The intelligent imaging device 208 may then convert the analog signal 234 into the digital signal 240. Because there may be millions or billons of pixels, the intelligent imaging device 208 generates a vast array or amount of data representing the digital image frame 244.

The intelligent imaging device 208 may analyze the pixel content represented by the digital image frame 244. The ISP 242 and/or the SOC 254 may process and analyze the pixel data associated with the digital image frame 244. The ISP 242 and/or the SOC 254 may independently or cooperatively execute an image analysis software application 258. The image analysis software application 258 may be stored in any memory hardware location, portion, or component of the intelligent imaging device 208. The image analysis software application 258 may additionally or alternatively be stored in the memory device 120 of the information handling system 100 (as illustrated in FIG. 1). The image analysis software application 258 has programming or instructions that cause the ISP 242 and/or the SOC 254 to perform operations, such as receiving the digital image frame 244 and performing the pixelated content image analysis. For example, the pixels representing the digital image frame 244 may be compared to a library of baseline or reference frames 260. Each reference frame 260 represents a different image output of the image sensor 232 at a particular position 248 or occlusion 250 of the shutter mechanism 222. Should the digital image frame 244 exactly or substantially match the pixel content of a reference frame 260, then the ISP 242 and/or the SOC 254 may infer that the shutter mechanism 222 is in the corresponding position 248 or occlusion 250. Moreover, the content analysis may be tuned or configured according to trainable content rules and policies 262. Exemplary embodiments may further train the content analysis using artificial intelligence according to any AI model 264. Exemplary embodiments may thus determine whether the shutter mechanism 222 is fully open, fully closed, or only partially open/closed.

Figure 4:
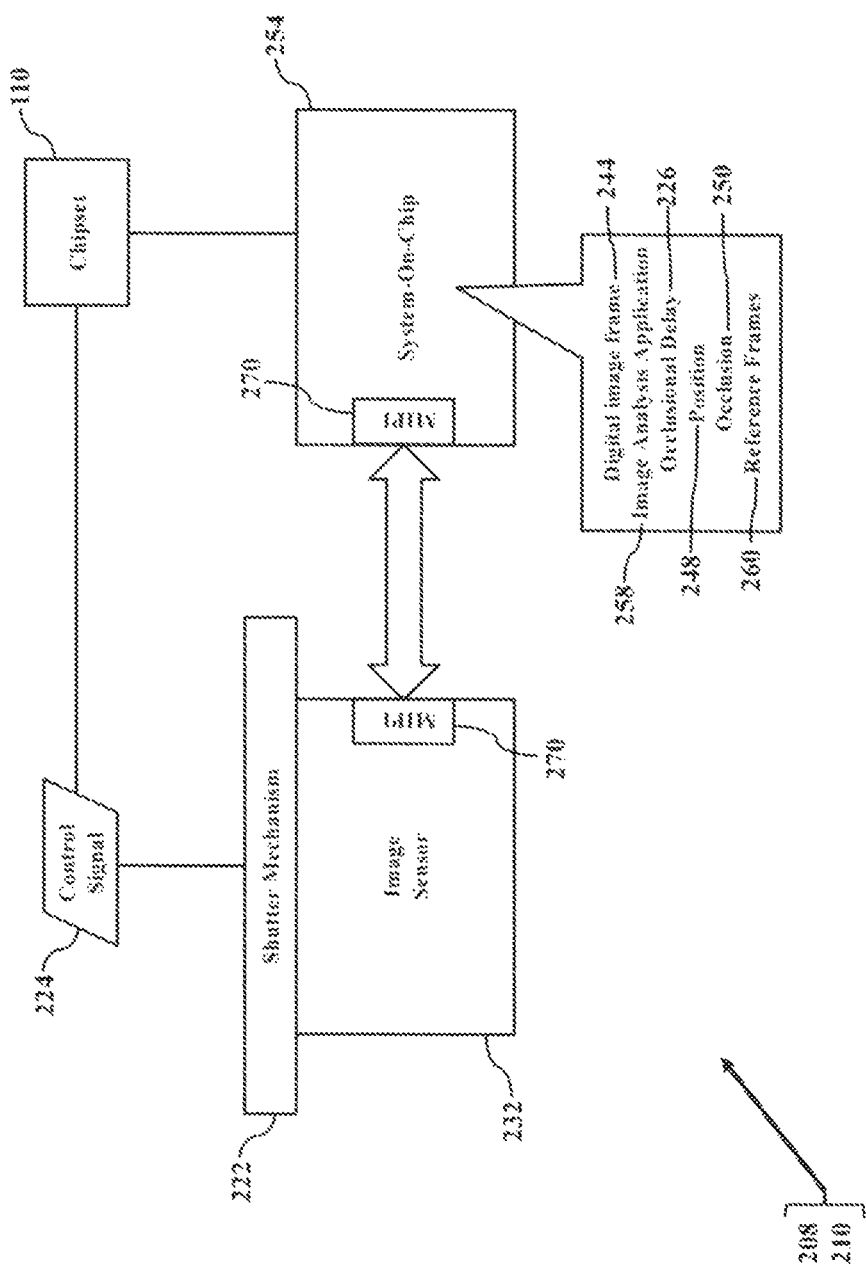
FIG. 4 illustrates improved computer functioning, according to exemplary embodiments.

FIG. 4 illustrates improved computer functioning, according to exemplary embodiments. When the shutter mechanism 222 is determined to be partially open, the laptop computer 200 (illustrated in FIG. 2) may nearly immediately disable or cut-off the image sensor 232 to protect privacy and security. When the shutter mechanism 222 is commanded to close/occlude (perhaps via the control signal 224), exemplary embodiments may stop interfacing with the image sensor 232 during the occlusional delay 226 to full close or 100% occlusion. When the shutter mechanism 222 is partially open, exemplary embodiments stop generating the digital frames 244, as no output is received from the image sensor 232. So, as the shutter mechanism 222 transitions during the occlusional delay 226 to full close or 100% occlusion, exemplary embodiments may disable the image sensor 232. The outputs from the image sensor 232 are blocked or shut-off to protect the user's privacy and to ensure secure operation.

Interfacing may be halted. As the shutter mechanism 222 transitions, during the occlusional delay 226, to full close or 100% occlusion, exemplary embodiments may stop receiving outputs generated by the image sensor 232. Exemplary embodiments, for example, may disable a Mobile Industry Processor Interface (or "MIPI") 270 between the image sensor 232 and SOC 254. The image sensor 232 is physically and/or logically separated, and communicatively cut-off, so no analog/digital pixel outputs are received from the image sensor 232. The SOC 254, in other words, has no image inputs to process, so the web camera 210 generates no outputs.

Signals or messages, for example, may be exchanged between the chipset 110 and the intelligent imaging device 208. The chipset 110 and the intelligent imaging device 208 are thus mutually informed of the operation, and inferred true state (such as the position 248 or occlusion 250), of the shutter mechanism 222. The chipset 110 and the intelligent imaging device 208 may communicate via any I/O interface (such as an Inter-Integrated Circuit or "I$^2$C" interface bus or System Management Bus or "SMBus"). Exemplary embodiments may automatically disable the MIPI 270, or exemplary embodiments may disable in response to the user's keyboard input (such as depression of a function key). Regardless, exemplary embodiments may control and change a default setting of the I/O control bus to disable the MIPI 270. These signals or messages may even be secured via secure key exchange between the chipset 110 and the intelligent imaging device 208 to ensure a failsafe mechanism. The intelligent imaging device 208 controls the camera control bus (typically I$^2$C serial) and enables or disables the MIPI signals from the image sensor 232. By using this intelligent shutter detection method, exemplary embodiments ensure that the "true" determined state of the shutter mechanism 222 is communicated to the chipset 110 to prevent security gap caused by inadvertent mismatch of shutter control signal to reality of actual shutter state.

More improved computer functioning is evident. Exemplary embodiments provide an absolute state of the image sensor 232, and its MIPI 270 data path, that is independent of the I/O control signal 224. Exemplary embodiments provide an intelligent hardware and firmware mechanism to protect the image sensor's output and secure sensor data from hackers. Exemplary embodiments fuse an absolute determination of the sensory occlusion 250 to correct (if required) with the control state of the shutter I/O control signal 224, such as in the case of EMS (electro-mechanical shutter mechanism 222). In the case of a purely user's mechanical operation (the manually operated shutter mechanism 222), exemplary embodiments intelligently notify the user (perhaps via a graphical pop-up notification and/or audible alert, as below explained) indicating a fault or error condition and user action to properly correct the shutter mechanism 222. Exemplary embodiments alert the user, and even a remote administrator, of a possible mechanical or EMS shutter malfunction in field use. Exemplary embodiments provide deterministic state analysis of the actual state of the image sensor 232, and closed feedback is provided to notify of possible fault conditions.

Figure 5:
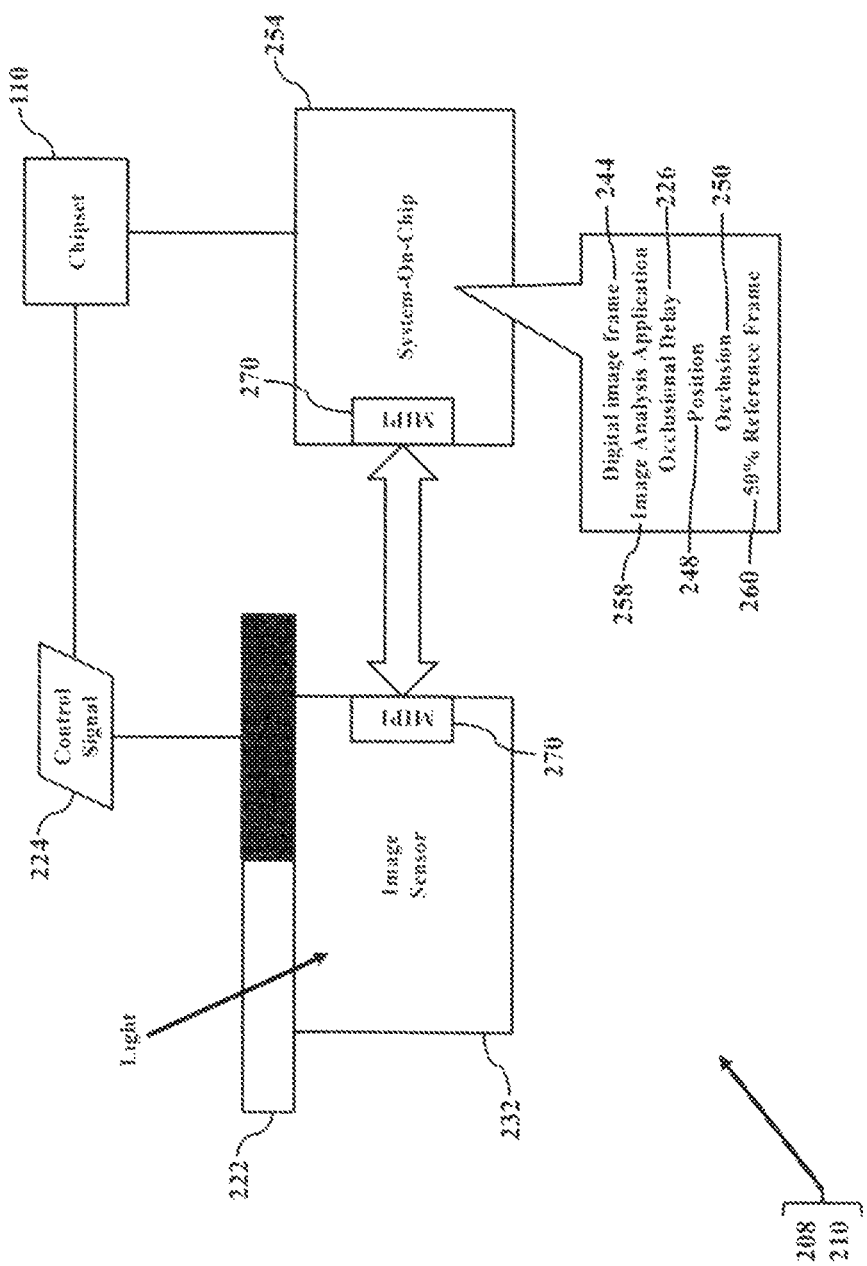
FIG. 5 illustrates occlusional inferences and corrections, according to exemplary embodiments.

FIG. 5 illustrates occlusional inferences and corrections, according to exemplary embodiments. The image analysis software application 258 infers the actual position 248 or occlusion 250 of the shutter mechanism 222, based on the current or nearly real-time pixel data represented by the frames 244. After the digital frame 244 is generated, the image analysis software application 258 causes or instructs the system-on-chip (SOC) 254 to compare the currently-generated frame 244 to the one or more reference images or frames 260. Each digital frame 244 may be individually analyzed, according to the trainable content rules and policies 262 (as explained with reference to FIG. 3). Moreover, artificial intelligence may analyze the content of each frame 244 according to the AI model 264 (also illustrated in FIG. 3).

The reference or baseline frames 260 are illustrated as being locally stored in the dedicated memory device of the intelligent imaging device 208. The reference or baseline frames 260, however, may be remotely stored and retrieved from any network location accessible via the laptop computer 200 (illustrated in FIG. 2). If the current frame 244 substantially or exactly matches one of the reference or baseline frames 260, then the image analysis software application 258 infers the corresponding position 248 or occlusion 250 of the shutter mechanism 222, perhaps regardless of the control signal 224.

One example is 50% occlusion. A 50% occlusion reference frame 260, for example, may be a historical or reference digital image (generated by the image sensor 232) representing light propagating through the shutter mechanism 222, when the shutter mechanism 222 is in a known, half-closed position 248 or half-occlusion 250. The intelligent imaging device 208 may thus compare the current digital frame 244 to the pixel data set representing 50% open position 248 or occlusion 250. If the pixel content/values of the current frame 244 substantially match the 50% occlusion reference frame 260, then the intelligent imaging device 208 may infer that the shutter mechanism 222 is currently in the corresponding 50% open position 248 or occlusion 250. The shutter mechanism 222 has moved half-way and still transitioning to the fully closed position or occluded condition. So, even though the I/O control signal 224 has been sent to close the shutter mechanism 222, the shutter mechanism 222 is transitioning and still allowing at least some light/photons to enter the image sensor 232. The web camera 210, in other words, is still generating the digital images 214 and video 216 (illustrated in FIG. 2) during the occlusional delay 226, despite the I/O control signal 224. The actual sensor occlusion 250 of the image sensor 232 thus lags the control signal 224, perhaps exposing a privacy or security condition.

Because the image sensor 232 is only 50% occluded, privacy and security protections may be implemented. Because light/photons are still entering the image sensor 232, exemplary embodiments may disable or disconnect the image sensor 232. The intelligent imaging device 208 may disable the Mobile Industry Processor Interface (or "MIPI") 270 to the image sensor 232. So, even though the image sensor 232 may still be generating outputs, those outputs are not received by the SOC 254. The SOC 254, in other words, has no image inputs to process, so the web camera 210 generates no outputs. Simply put, because the image sensor 232 is only 50% occluded, exemplary embodiments may cut-off the image sensor 232. Exemplary embodiments infer the true state (position 248 or occlusion 250) of the shutter mechanism 222 and prevent a security gap caused by inadvertent mismatch of shutter I/O control signal to reality of actual shutter state.

As the reader may realize, other baseline reference images may be stored. The above paragraphs describe the 50% open position 248 or occlusion 250 that represents an historical image reference frame 260 when the shutter mechanism 222 is in a known, half-closed position 248 or half-occlusion 250. The intelligent imaging device 208, however, may also store and compare a 25% occlusion reference frame 260 representing quarter-closed position 248 or quarter-occlusion 250. A 10% or even 5% occlusion reference frame 260 may be defined for even smaller shutter positions 248 or occlusions 250. While even the smallest shutter positions 248 or occlusions 250 may be baselined, the image sensor 232 and/or the ISP 242 may have speed/processing limitations when generating the frames 244. Time, in other words, is required to generate the frames 244, so the ISP's processing capabilities may determine the quickest or minimum reference data set that may be compared.

Figure 6:
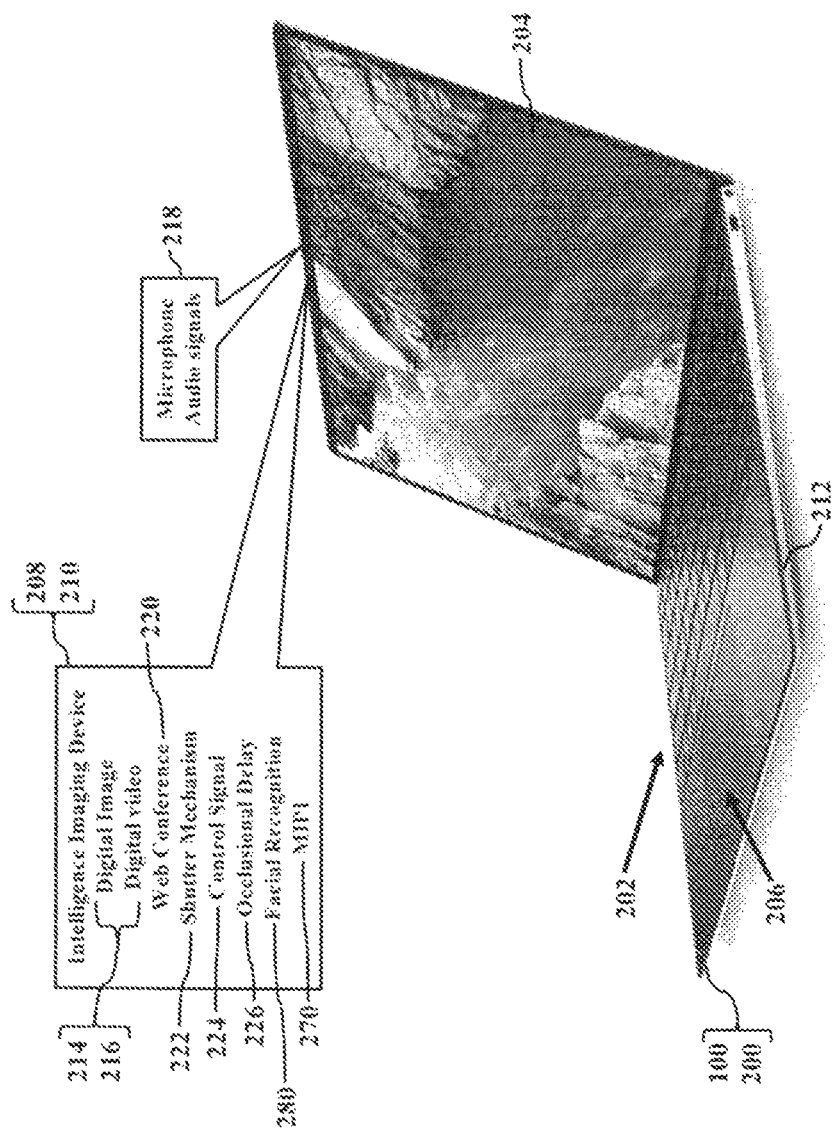
FIGS. 6-7 illustrate predictive enhancements, according to exemplary embodiments.
Figure 7:
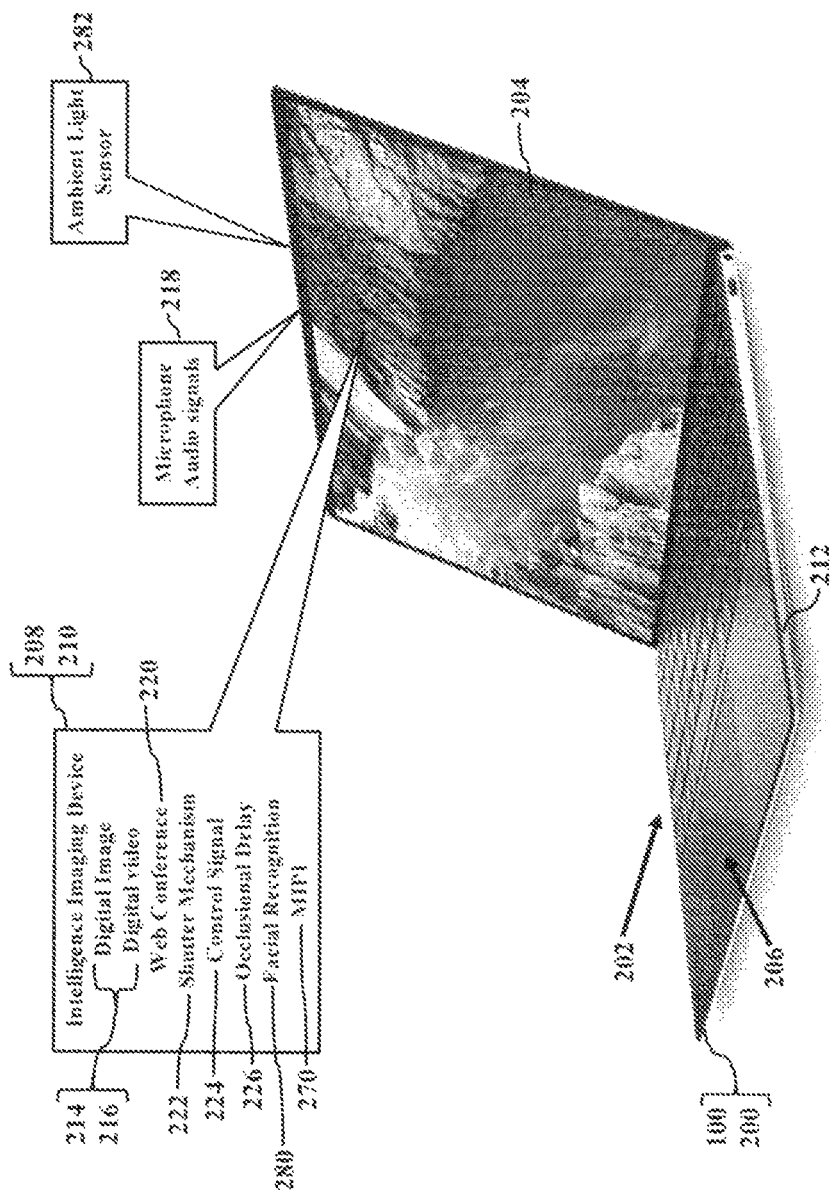

FIGS. 6-7 illustrate predictive enhancements, according to exemplary embodiments. As this disclosure above explained, exemplary embodiments may be especially implemented during the web conference 220. The web camera 210 captures the user's face, and the laptop computer 200 shares the user's face during the web conference 220. However, should the user desire privacy, the user may instruct the laptop computer 200 to close or activate the shutter mechanism 222. The user, for example, may input a predefined keystroke (such as particular function key) that causes the laptop computer 200 to send the I/O control signal 224 to the shutter mechanism 222. When the shutter mechanism 222 receives the I/O control signal 224, the shutter mechanism 222 begins or starts transitioning from 0%-100% occlusion. Because of the occlusional delay 226, though, the shutter mechanism 222 is partially open and the image sensor 232 continues generating outputs representing the user's face. Exemplary embodiments may implement corrective measures to ensure the user's facial features are not shared during the period of occlusional delay 226.

Facial recognition 280 may be used. Here the intelligent imaging device 208 may interface or cooperate with any facial recognition system to identify the known user's face features in the frames 244. The intelligent imaging device 208, for example, may hand-off the current frames 244 to the INTEL® Visual Sensing Controller, the EMZA Visual Sensory system, or any other vision based neural network engine (not shown for simplicity). However the facial recognition 280 is implemented, the facial recognition 280 samples the pixel content of the frames 244 to determine the facial presence of the user within the field 236 of view of the web camera 210 (such as a quarter video graphics array (or QVGA) representing a ¼ screen resolution). The reference or baseline frames 260 may thus store or contain image calibrations representing the user's facial features at different positions 248 or occlusions 250. The reference or baseline frames 260 may further be defined or generated based on a pre-determined operating lighting condition for the web camera 210 (for example, a low light of 30 lux to 1000 lux). The frames 244 may even be analyzed for creation of the AI model 264 (illustrated in FIG. 3). So, when the web camera 210 operates in real time (such as during the web conference 220), the intelligent imaging device 208 may run or generate 1 to 2 fps as an input camera stream in low resolution of up to QVGA for detecting the human user's facial presence with the facial recognition 280. When the user's facial presence is detected, that frame 244 may be analyzed and compared to any of the reference or baseline frames 260. The reference or baseline frames 260, for example, may represent the user's facial features at sequential positions 248 or occlusions 250 associated with the opening/closing shutter mechanism 222 (for example, full open, full close, partially open). Should an image/frame match be determined, the intelligent imaging device 208 controls the camera control bus (typically I²C serial or general purpose I/O path) and disables the MIPI 270 signals. In plain words, then, if the user's face is recognized during the occlusional delay 226, then her privacy may be at risk during the operation of the shutter mechanism 222. In response to the facial recognition 280, exemplary embodiments disable the MIPI 270 to stop receiving outputs from the image sensor 232 (illustrated in FIGS. 3-5). Should the user later open or release the shutter mechanism 222 (such as subsequently entering a predefined keystroke), exemplary embodiments re-enable the MIPI 270 to receive outputs from the image sensor 232.

FIG. 7 illustrates ambient light sensing. Low-light conditions may affect the facial recognition 280. As a simple example, if ambient background light is low or dark, these low-light conditions may reduce the ability of the facial recognition 280 to recognize the user's face in the current digital frame 244. Low-light conditions may thus trick the facial recognition 280 such that the user's facial features are not identified in the frames 244. The user's face may still be conveyed during the conference call 220, despite the shutter mechanism 222 being partially open or partially occluded. Low-light conditions could thus defeat the privacy and security protections.

The intelligent imaging device 208 may thus sense, and/or infer, ambient light. An ambient light sensor 282, for example, may generate a sensory output having a value representing an amount of ambient light. The output from the ambient light sensor 282 may be received by the chipset 110 (illustrated in FIG. 1), perhaps after A/D conversion (if needed). The chipset 110 may then send or relay the output to the intelligent imaging device 208 and/or to the facial recognition system. The ambient light sensor 282, however, may interface with the intelligent imaging device 208, thus allowing the sensory output to be received by the intelligent imaging device 208 and perhaps forwarded to the facial recognition system 280. Regardless of the architecture, the sensory output from the ambient light sensor 282 may be used to augment and/or to compensate for the facial recognition 280 in low-light conditions. When the brightness in the room may be below the low light threshold (such as the low light 30-1000 lux used in the reference or baseline frames 260), the sensory output from the ambient light sensor 282 may be used to confirm the reading of the web camera's pixel brightness corresponding to the discrete ambient light sensor 282.

Exemplary embodiments thus greatly improve computer functioning. As the laptop computer 200 conducts the web conference 220, the web camera 210 captures the digital images 214 and video 216. When the user wishes video/image privacy, for whatever reason, the user requests the shutter mechanism 222 (such as by depressing or entering a Function key command). The laptop computer 200 interprets the user's input (a keyboard scancode) and issues the I/O control signal 224 to close/occlude the shutter mechanism 222. However, because the shutter mechanism 222 requires time to fully transition to 100% occlusion, the image sensor 232 in the web camera 210 continues generating outputs representing the user's face. Exemplary embodiments, then, may estimate or infer the position 248 and/or occlusion 250 of the shutter mechanism 222 based on different facial recognition reference image frames 260. If the user's face is recognized, then the intelligent imaging device 208 infers that the shutter mechanism 222 is partially open and privacy/security are jeopardized. In response, then, the intelligent imaging device 208 may disconnect the image sensor 232 to stop generating the frames 244 revealing the user's face.

Figure 8:
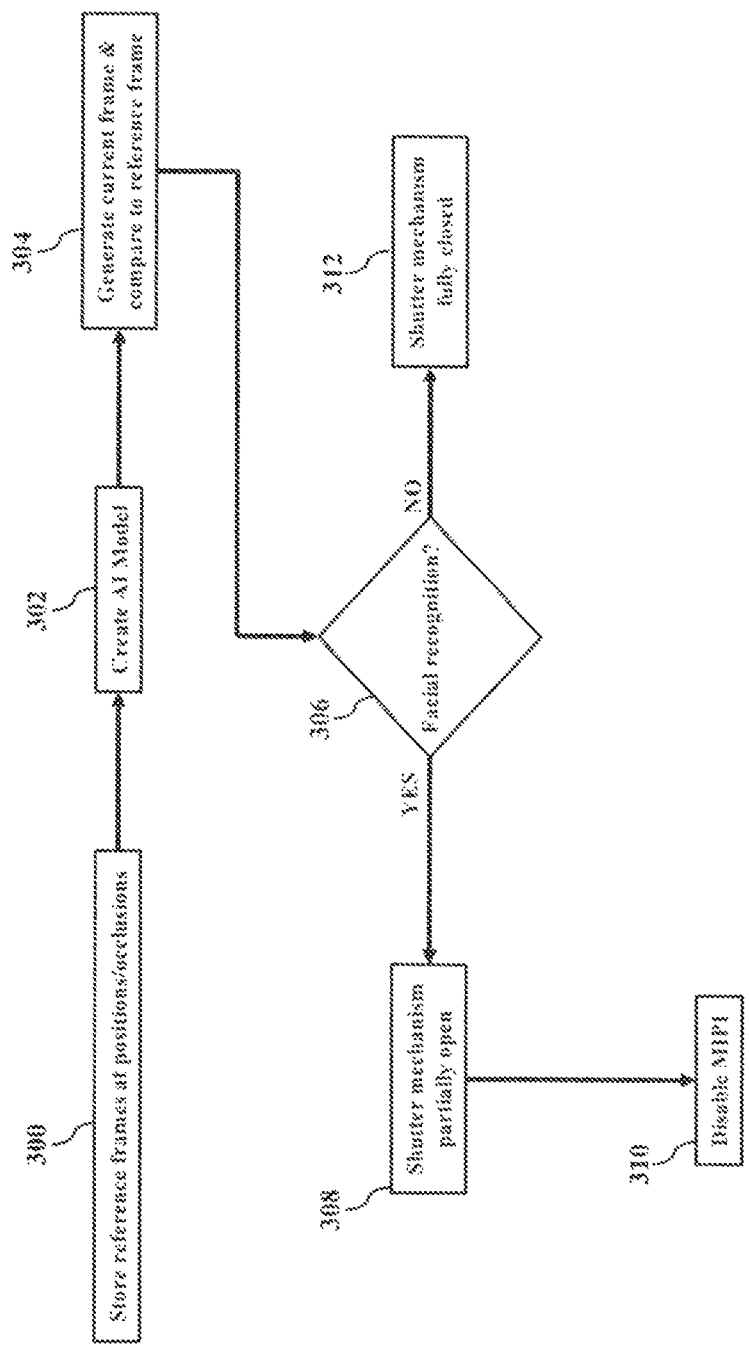
FIG. 8 illustrates a method or algorithm for halting generation of digital images, according to exemplary embodiments.

FIG. 8 illustrates a method or algorithm for halting generation of digital images, according to exemplary embodiments. The intelligent imaging device 208 is calibrated by storing one or more of the reference or baseline frames 260 describing different positions 248 or occlusions 250 of the shutter mechanism 222 (Block 300). The AI model 264 is created (Block 302), perhaps based on the facial recognition 280 and pre-determined operating lighting conditions. During real-time operation, the current or real-time digital frame 244 is generated and compared to the reference or baseline frames 260 (Block 304), perhaps according to pre-determined operating lighting conditions and the AI model 264. If the facial recognition 280 is confirmed (the user's face is detected in the digital frame 244) (Block 306), the shutter mechanism 222 is at least partially open (Block 308). In response to the shutter mechanism 222 being at least partially open, the intelligent imaging device 208 disables the MIPI 270 (Block 310). However, if the facial recognition 280 is not confirmed (the user's face is not detected in the digital frame 244) (Block 306), then the shutter mechanism 222 is fully closed (Block 312).

Figure 9:
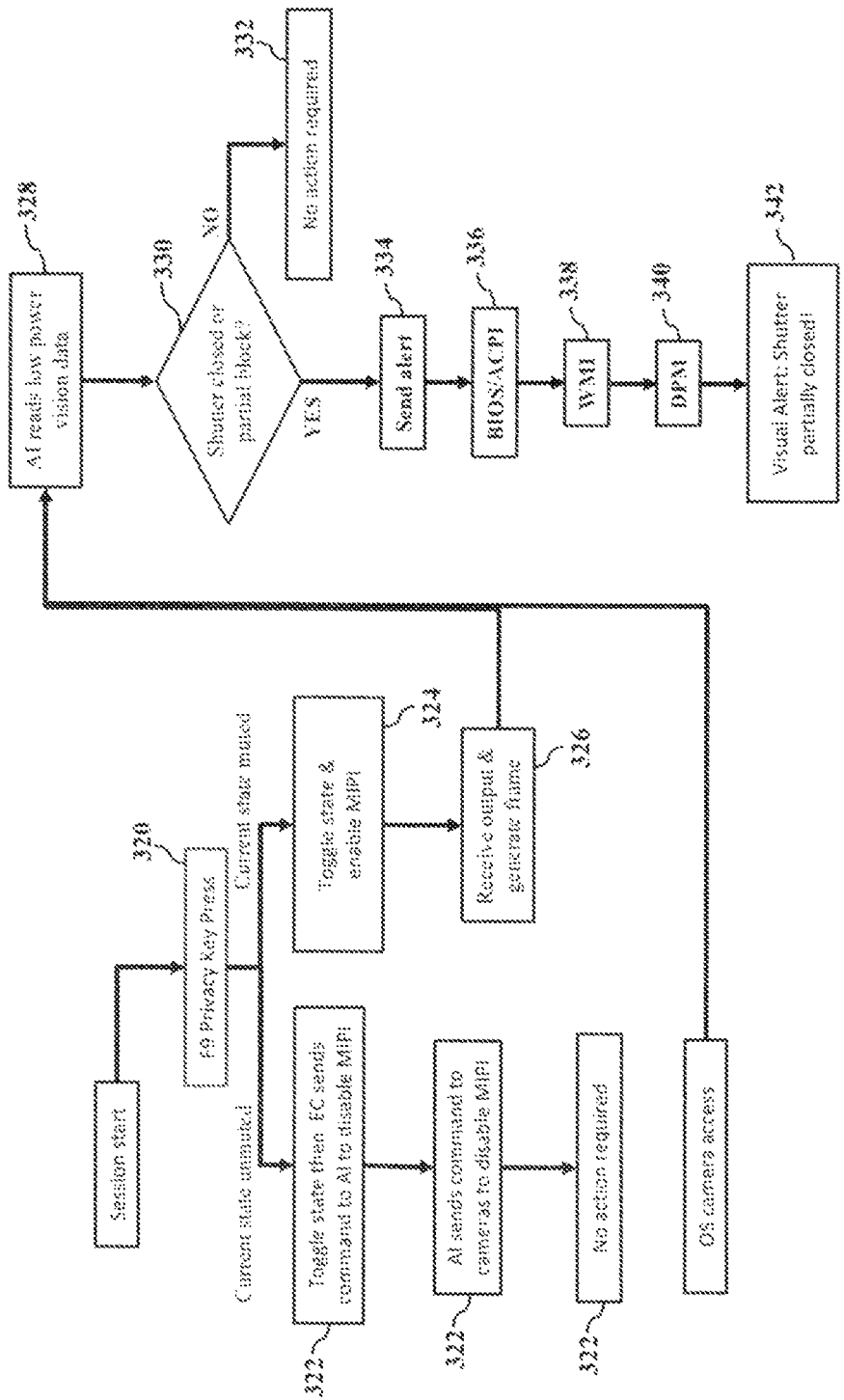
FIG. 9 illustrates a method or algorithm for determining a shutter mechanism is partially closed, according to exemplary embodiments.

FIG. 9 illustrates a method or algorithm for determining the shutter mechanism 222 is partially closed, according to exemplary embodiments. As the reader may now realize, the user may want the web camera 210 to operate (that is, generate the images 214 and video 216), but the shutter mechanism 222 is at least partially closed. The shutter mechanism 222, in other words, at least partially occludes the image sensor 232, so the intelligent imaging device 208 may only generate perhaps poor quality images of the user's face. As a simple example, the shutter mechanism 222 may be a door or panel that the user manually slides to reveal, or to hide, the web camera 210. If the user desires the web camera 210 to operate, but the user has forgotten to open the door or panel, then the shutter mechanism 222 at least partially blocks the web camera 210, yielding incomplete/fuzzy/block images of the user's face.

As FIG. 9 illustrates, the user may enter an input (such as a keyboard input) that is sent (perhaps as a scan code) to the information handling system 100. The information handling system 100 interprets the scancode as privacy related (Block 320). If the web camera 210 (and/or the microphone 218) is un-muted or enabled, then the current state is toggled to mute and a controller (such as the chipset 110) instructs or commands the intelligent imaging device 208 to disable the MIPI 170 (Block 322). However, if the web camera 210 (and/or the microphone 218) is muted or disabled, then the current state is toggled to un-mute and the MIPI 170 is enabled (Block 324). Because the MIPI 170 is enabled, the intelligent imaging device 208 receives outputs generated by the image sensor 232 and generates the digital frame 244 (Block 326). The sensory output from the ambient light sensor 282 is received (Block 328). The position 248/occlusion 250 is determined based on the digital image frame 244, the baseline reference frames 260, and the sensory output from the ambient light sensor 282 (Block 330). If the shutter mechanism 222 is fully open, then no action is required (Block 332). When, however, the shutter mechanism 222 is closed or partially blocked (Block 330), then the intelligent imaging device 208 alerts the chipset 110 (Block 334), which notifies the operating system, the BIOS, an Advanced Configuration and Power Interface (or ACPI) (Block 336), the WINDOWS® Management Instrumentation (or "WMI") (Block 338), and the WINDOWS® Data Protection Manager (Block 340). The information handling system 100 thus visually and/or audibly presents an alert notifying the user that the shutter mechanism 222 is partially blocking the web camera 210 (Block 342).

Figure 10:
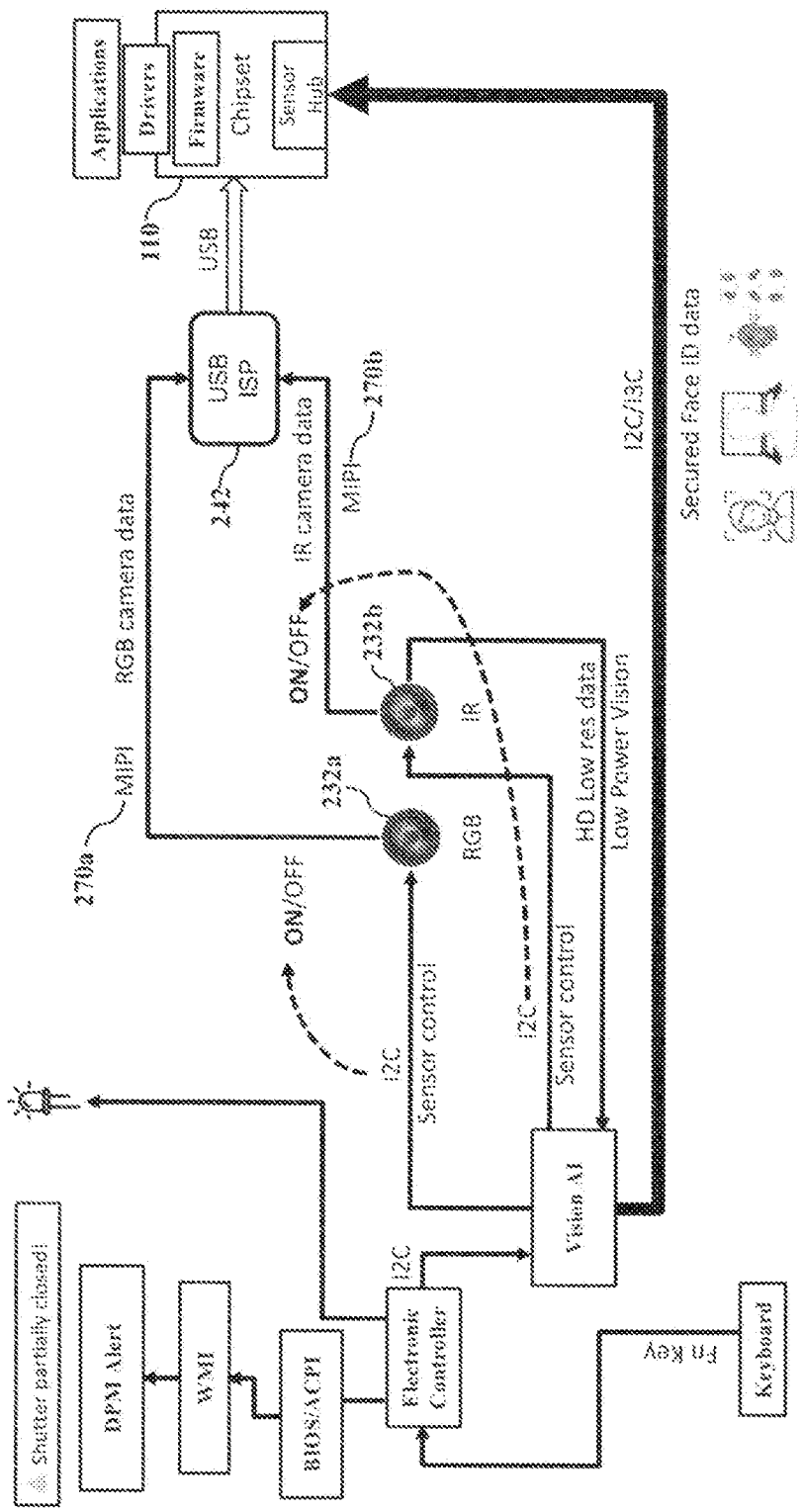
FIGS. 10-14 illustrate more details for securing vision data by inferring a state of the shutter mechanism, according to exemplary embodiments.
Figure 11:
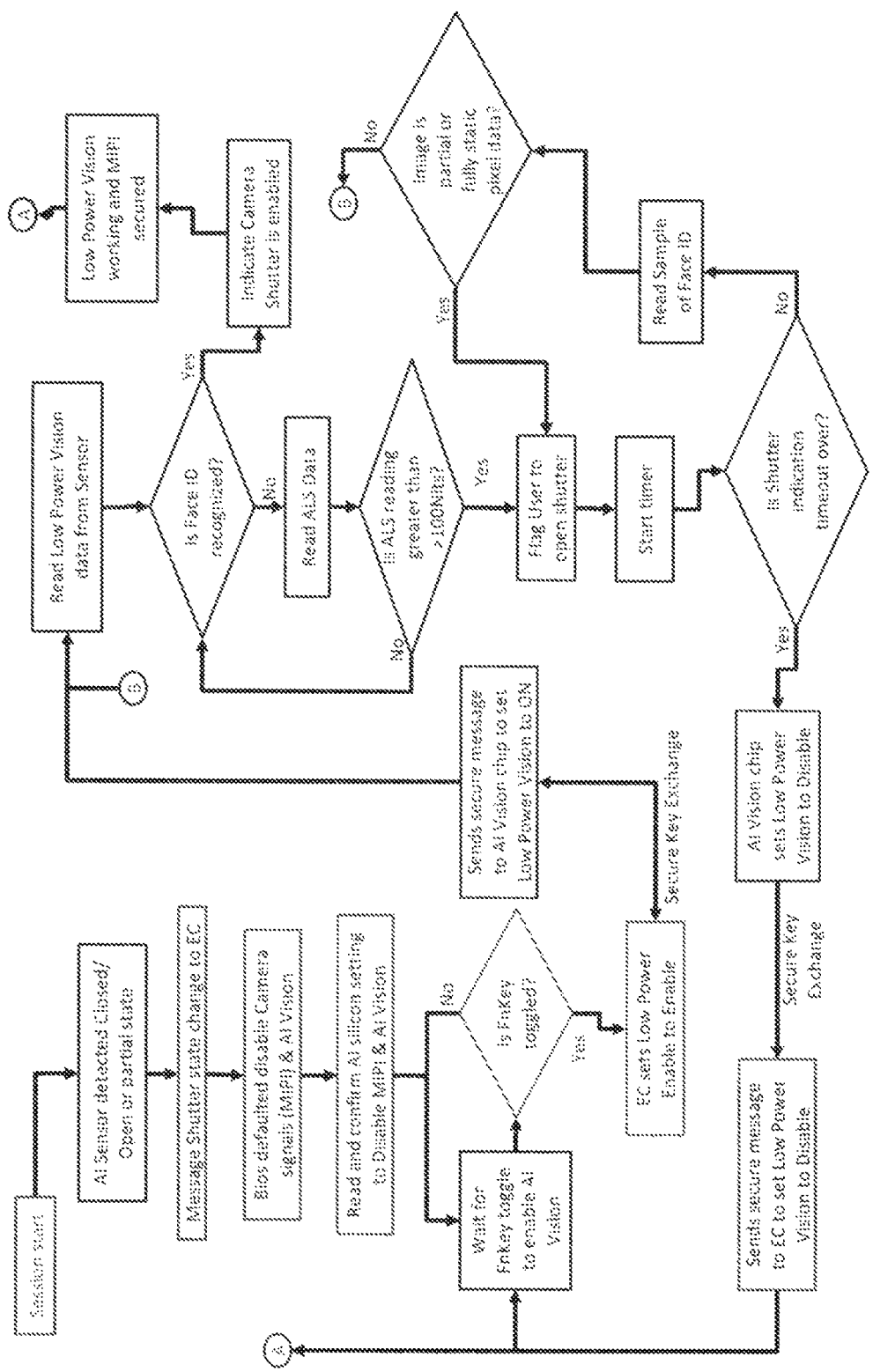
Figure 12:
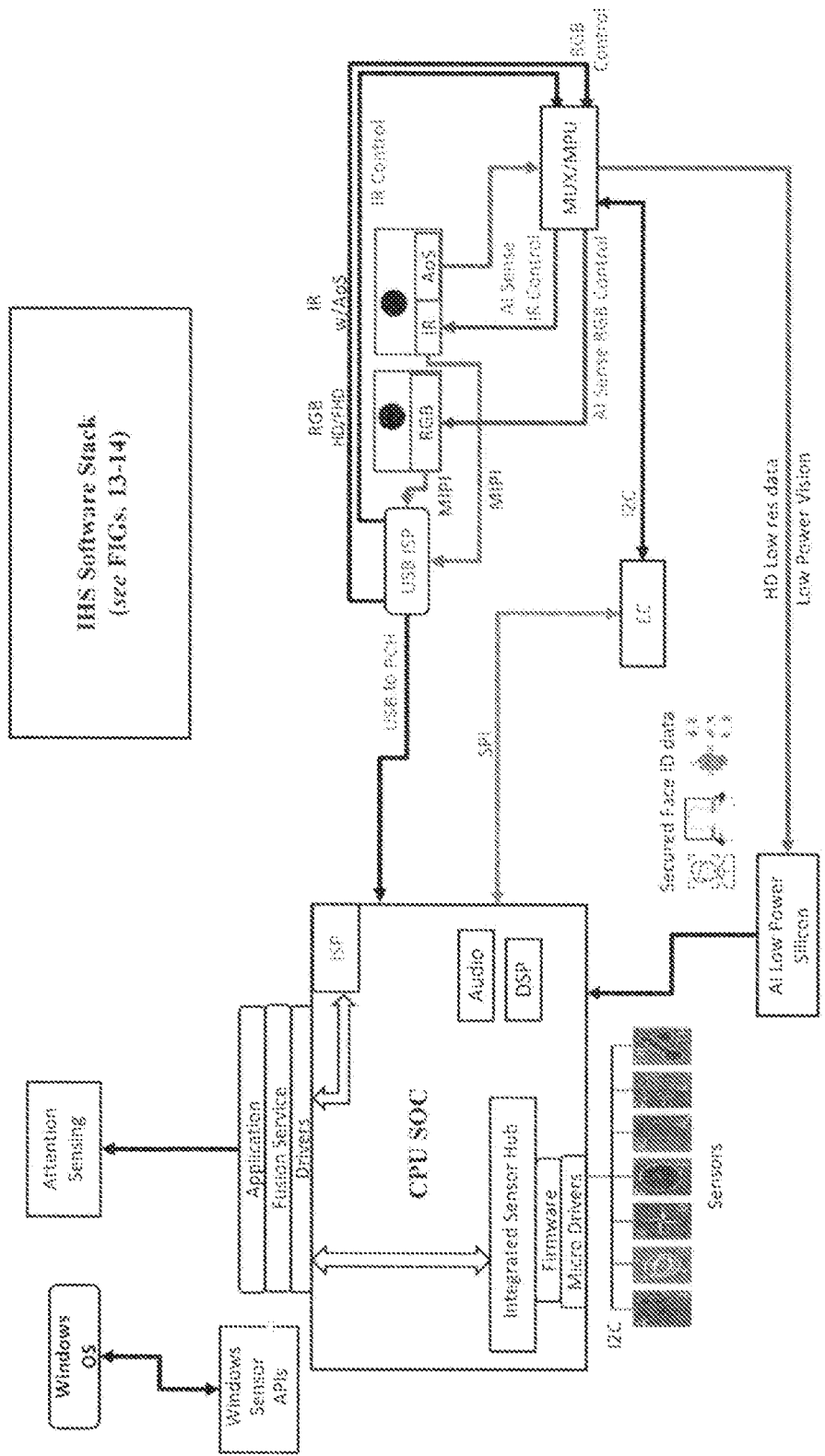
Figure 13:
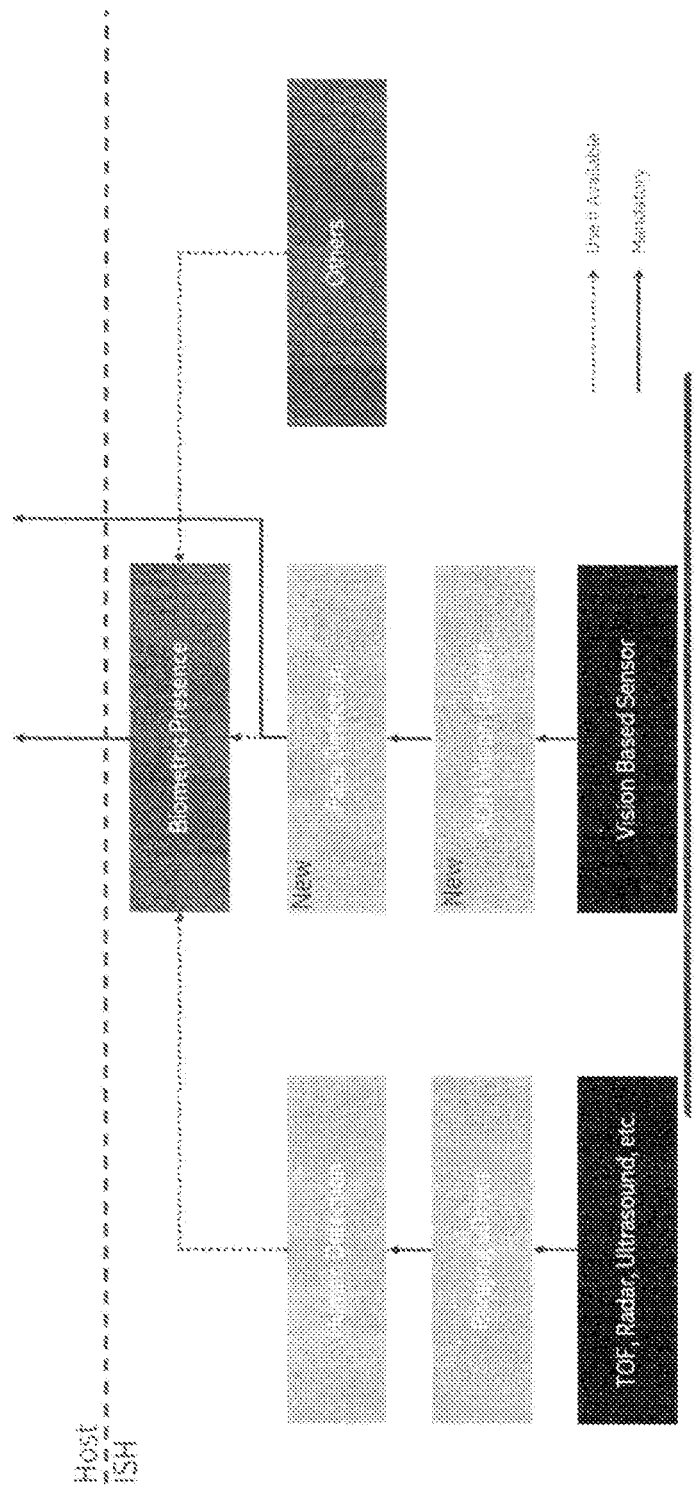
Figure 14:
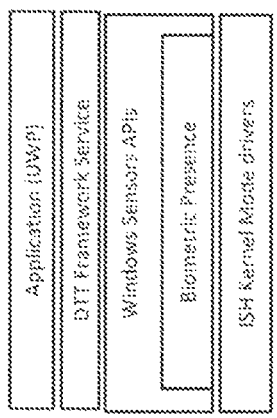

FIGS. 10-14 illustrate more details for securing vision data by inferring a state of the shutter mechanism 222, according to exemplary embodiments. FIG. 10 illustrates a hardware implementation for controlling the on/off state of the MIPI 170. FIG. 11 illustrates a method or algorithm for securing vision data using the shutter mechanism 222. FIGS. 12-14 illustrate a circuitry architecture. FIGS. 10-14, in particular, illustrate how exemplary embodiments may be applied to any image sensor technology and to any number of image sensors 232. FIGS. 10-14, for example, illustrate both an RGB image sensor 232*a* and an infrared (IR) image sensor 232*b*. Each imager sensor 232*a* and 232*b* may have its corresponding MIPI 170*a-b* to the ISP 242 and, perhaps via a USB connection, to the chipset 110. Indeed, the information handling system 100 may have multiple or many image sensors 232, and exemplary embodiments may selectively enable or disable the corresponding MIPI 170. Exemplary embodiments securely and selectively cut-off access to either, or both, of the imager sensors 232*a* and 232*b* by disabling their respective MIPI 170*a* and 170*b*. By shutting down the MIPI 170*a* and 170*b*, exemplary embodiments privacy harden any conferencing or camera capabilities by eliminating vision data from the image sensor 232. Whatever the vision system, the vision system may send commands to the intelligent imaging device(s) 208 to disconnect the image sensor 232*a-b*. Moreover, exemplary embodiments may have an auto-disable feature. The user, for example, may configure a timer that counts or increments from an initial time to a final time. As the timer increments, exemplary embodiments monitor for commands, inputs, or other data enabling the imager sensor 232 and/or the intelligent imaging device(s) 208. Should the timer expire without enablement, exemplary embodiments may infer non-use and automatically disable or turn off the corresponding MIPI 170.

Exemplary embodiments may include a self-governing camera system 208 which adjusts its own operating state based on detection of visual content in the field 236 of view. Exemplary embodiments may include a camera system which self-governs based on content classified as a known or recognized shutter occlusion 250. Exemplary embodiments allow a user or administrator to define the parameters under which their camera device 208 will self-govern its operating state. Exemplary embodiments may include a camera system 208 which can automatically enforce the actuation of the shutter mechanism 222 in response to content detected within its field 236 of view.

Exemplary embodiments provide many advantages. Exemplary embodiments mitigate the risk that a user will wittingly or unwittingly broadcast objectionable or embarrassing content to their colleagues or clients. Exemplary embodiments mitigate the risk that sensitive information in a user's background may be inadvertently displayed. Exemplary embodiments reduce the liability of companies who may be at risk of claims and damages if employees are subjected to inappropriate or objectionable content. Exemplary embodiments help users present a consistent and professional appearance to their colleagues and clients.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, executed by an information handling system, that disables an interface with an image sensor based on a comparison of digital images, comprising:
   receiving, by the information handling system, an output photoelectrically generated by the image sensor;
   generating, by the information handling system, a digital image frame based on the output photoelectrically generated by the image sensor;
   comparing, by the information handling system, the digital image frame to a shutter reference image associated with a shutter mechanism;
   in response to the digital image frame matching the shutter reference image associated with the shutter mechanism, determining, by the information handling system, the shutter mechanism is partially open and allowing a light to enter the image sensor; and in response to the determining that the shutter mechanism is partially open, preventing, by the information handling system, the receiving of the output generated by the image sensor by disabling the interface with the image sensor.

2. The method of claim 1, further comprising comparing pixels between the digital image frame and the shutter reference image associated with the shutter mechanism.

3. The method of claim 1, further comprising inferring an occlusion of the image sensor based on the digital image frame.

4. The method of claim 1, further comprising inferring a position of the shutter mechanism based on the digital image frame.

5. The method of claim 1, wherein in response to the digital image frame failing to match the shutter reference image, further comprising determining the shutter mechanism is fully open.

6. The method of claim 1, wherein in response to the digital image frame failing to match the shutter reference image, further comprising determining the shutter mechanism is fully closed.

7. The method of claim 1, wherein the disabling of the interface further comprises disabling a Mobile Industry Processor Interface with the image sensor.

8. A system that disables an interface with an image sensor based on a pixelated comparison of digital images, comprising:
a processor; and
a memory device storing instructions that when executed by processor perform operations including:
receiving an output photoelectrically generated by the image sensor;
generating a digital image frame based on the output photoelectrically generated by the image sensor;
comparing pixels associated with the digital image frame to a shutter reference image associated with a shutter mechanism;
in response to the pixels associated with the digital image frame matching the shutter reference image associated with the shutter mechanism, determining the shutter mechanism is partially open and allowing a light to enter the image sensor; and
in response to the determining that the shutter mechanism is partially open, preventing the receiving of the output photoelectrically generated by the image sensor by disabling the interface with the image sensor.

9. The system of claim 8, wherein the operations further include inferring an occlusion of the image sensor based on the pixels associated with the digital image frame.

10. The system of claim 8, wherein the operations further include inferring a position of the shutter mechanism based on the pixels associated with the digital image frame.

11. The system of claim 8, wherein in response to the pixels associated with the digital image frame failing to match the reference image, the operations further include determining the shutter mechanism is fully open.

12. The system of claim 8, wherein in response to the pixels associated with the digital image frame failing to match the shutter reference image, the operations further include determining the shutter mechanism is fully closed.

13. The system of claim 8, wherein the operations further include disabling a Mobile Industry Processor Interface with the image sensor.

14. A memory device storing instructions that when executed by a hardware processor perform operations, the operations comprising:
receiving an output photoelectrically generated by the image sensor;
generating a digital image frame based on the output photoelectrically generated by the image sensor;
comparing pixels associated with the digital image frame to a shutter reference image associated with a shutter mechanism;
in response to the pixels associated with the digital image frame matching the shutter reference image associated with the shutter mechanism, determining the shutter mechanism is partially open and allowing a light to enter the image sensor; and
in response to the determining that the shutter mechanism is partially open, preventing the receiving of the output photoelectrically generated by the image sensor by disabling the interface with the image sensor.

15. The memory device of claim 14, wherein the operations further include inferring an occlusion of the image sensor based on the pixels associated with the digital image frame.

16. The memory device of claim 14, wherein the operations further include inferring a position of the shutter mechanism based on the pixels associated with the digital image frame.

17. The memory device of claim 14, wherein in response to the pixels associated with the digital image frame failing to match the shutter reference image, the operations further include determining the shutter mechanism is fully open.

18. The memory device of claim 14, wherein in response to the pixels associated with the digital image frame failing to match the shutter reference image, the operations further include determining the shutter mechanism is fully closed.

19. The memory device of claim 14, wherein the operations further include disabling a Mobile Industry Processor Interface with the image sensor.

* * * * *